United States Patent Office 3,519,261
Patented July 7, 1970

3,519,261
SEAT SPRING ATTACHMENT MEANS
Zygmunt M. Surletta, Detroit, Mich., and John J. Bond, Wickenburg, Ariz., assignors to Lear Siegler, Inc., Detroit, Mich., a corporation of Michigan
Filed May 16, 1968, Ser. No. 729,631
Int. Cl. A47c 23/16
U.S. Cl. 267—110                             7 Claims

ABSTRACT OF THE DISCLOSURE

A bracket of the type for attaching a sinuous spring strip to a frame member in a seating assembly. The bracket including a base with a pair of spaced parallel flanges extending from the base and a supporting lip extending from the base in the opposite direction from the flanges and including holes so that the lip may be attached to the frame member. There are a plurality of hook slots being paired so that a portion of the spring strip may be disposed in a pair of hook slots at any one of a plurality of various different positions relative to the frame member.

---

Cushion assemblies which are utilized as seats or backs in the prior art, include a frame means comprising at least a pair of spaced generally parallel frame members which are interconnected to define a space therebetween and across which sinuous spring strips extend. The opposite ends of the spring strips are secured to the frame members. Various prior art devices are known and utilized for securing the ends of sinuous spring strips to the frame members. Frequently, a metal clip having a hooked portion is secured to the frame member with the hook portion disposed about the sinuous spring strip. These clips and other similar devices are of many configurations but all share the deficiency of requiring that the spring strip be attached to or positioned relative to the frame member at a given fixed position along a line which is generally transverse to the frame member and the sinuous spring strip, i.e., in a generally vertical direction in a seat cushion assembly.

It is frequently desirable to utilize a certain frame configuration but to vary the pitch of the springs attached to the frame from one assembly to another. In other words, in a first frame of a certain configuration, it may be desirable to attach the springs to the frame so that they do not slant from one end to the other whereas it may be desirable to use another frame of exactly the same configuration with springs that do slant from one end to the other. In order to accomplish this in accordance with the prior art, the clips or other devices utilized for securing the spring strips to the frame must be prepositioned in the correct desired position in order to provide the desired end configuration.

In addition, it is frequently desirable, in fabricating what is known in the art as a bucket seat, to attach the outside spring strips to the frame at a higher position than the middle spring strips are attached to the frame and to do this in accordance with present techniques, the clips or assemblies attaching the ends of the spring strips to the frames must be prepositioned at the desired position on the frame.

Accordingly, it is an object and feature of this invention to provide a bracket of the type for attaching a spring strip to a frame in a seating assembly which includes a plurality of attaching means for supporting a spring strip at any one of a plurality of different positions on the bracket whereby such brackets may be secured to a plurality of frame means which are all of the same configuration but each frame means may provide a different seat assembly as the spring strips are attached thereto at different positions.

Other objects and attendant advantages of the present invention will be readily appreciated as the same becomes better understood by reference to the following detailed description when considered in connection with the accompanying drawings wherein.

Referring to the drawings wherein like numerals indicate like or corresponding parts throughout the several views a seating assembly constructed in accordance with the instant invention is generally shown at 10.

Figure 1:
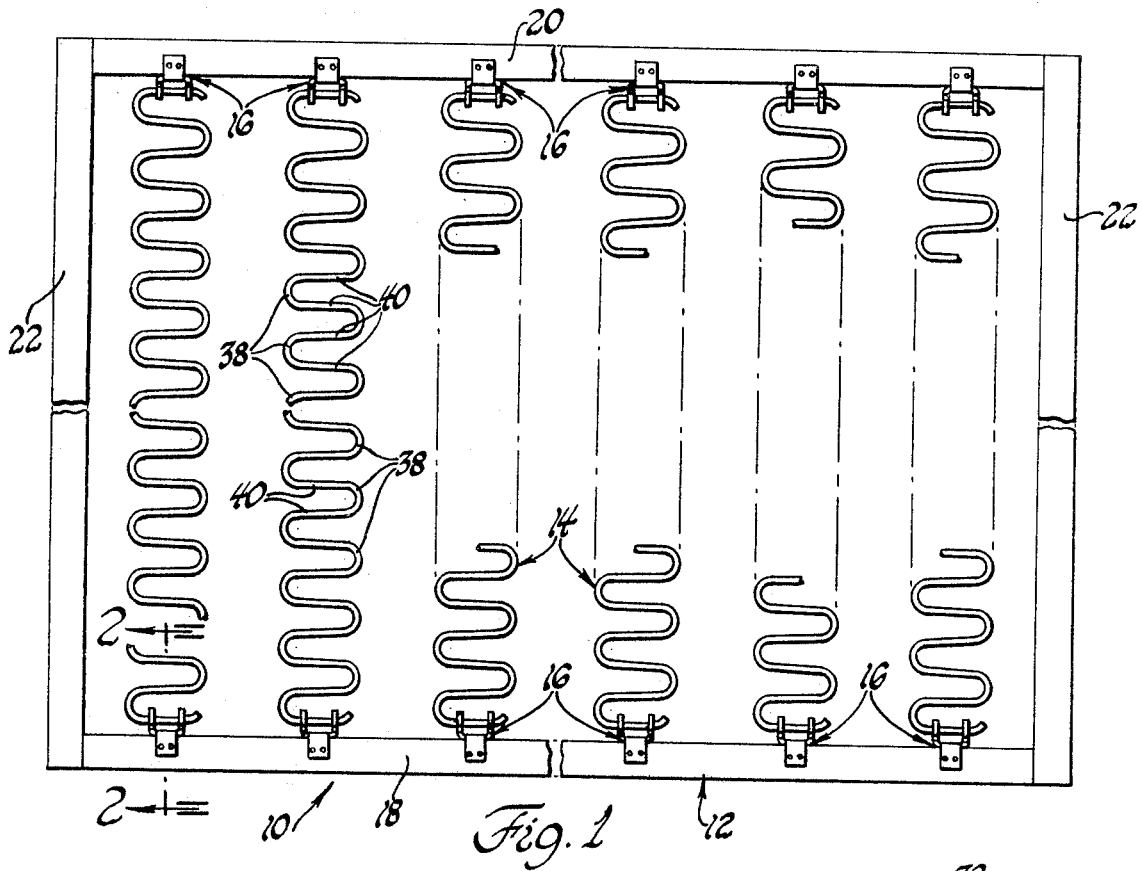
FIG. 1 is a plan view of a seating assembly constructed in accordance with the instant invention.

The seating assembly 10 includes a frame means generally indicated at 12, a plurality of spring strips each of which is generally indicated 14, and a plurality of brackets each of which is generally indicated at 16.

The frame means 12 includes a pair of spaced frame members 18 and 20 which are interconnected at the ends thereof by the frame members 22. There are included a plurality of spring strips 14 with first and second ends respectively attached to the frame members 18 and 20. As illustrated, the brackets 16 are utilized to connect both ends of the respective spring strips 14 to the frame members 18 and 20, but only one end of each spring strip need be thusly connected and other means may be utilized to connect the other end of each spring strip to the frame means.

Each bracket 16 includes a plurality of attachment means each of which comprises a hook slot 24 for supporting an end of a spring strip 14 at any one of a plurality of positions on the bracket 16. The hook slots 24 are spaced from one another along each bracket 16 in a direction which is generally transverse to the associated spring strip 14, as well as being transverse to the associated frame member 18 or 20.

Each bracket 16 includes first and second flanges 26 and 28 which extend from one side of a base 30. The hook slots 24 are spaced from one another along the respective flanges 26 and 28. The flanges 26 and 28 are spaced from and parallel to one another and the hook slots in one flange are paired with the hook slots in the other flange. In other words, as viewed in FIG. 2, the hook slots 24 in the flange 26 are horizontally aligned with the hook slots 24 in the flange 28. The bracket also includes a support lip 32 which extends transversely from the base 30 in a direction which is opposite from the flanges 26 and 28 and rests upon the frame member 18. The lip 32 includes means comprising the holes 34 for attachment to the frame member 18 by the nails 36.

As illustrated, each hook slot 24 extends into a flange and changes direction so that a portion of a spring strip may be inserted and moved along the slot to a position where a force applied longitudinally along the spring strip will urge that portion of the spring strip disposed in the slot against one extremity of the slot to retain the spring strip in position. Although the hook slots 24 illustrated are arcuate or crescent shaped at the end thereof, it will be understood that the hook slots may be rectangular, pointed, or of various other configurations.

Figure 2:
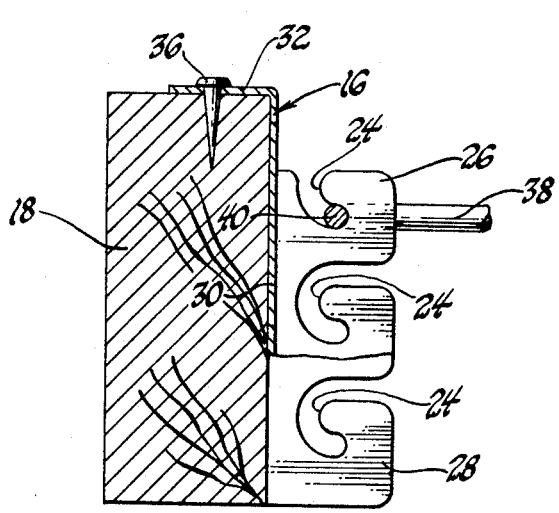
FIG. 2 is an enlarged fragmentary cross-sectional view taken substantially along line 2—2 of FIG. 1.
Figure 3:
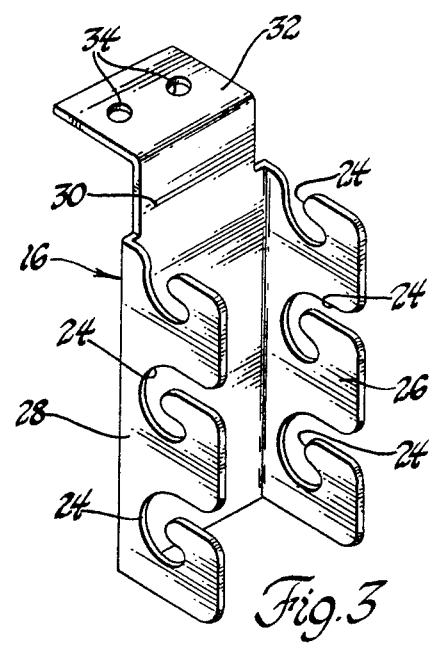
FIG. 3 is a perspective view of a preferred embodiment of the bracket constructed in accordance with the instant invention.

Each spring strip is zigzag in form or configuration therealong and although the spring strips illustrated are sinuous, it will be understood that other spring strips, such as those having 90 degree bends therein to form zigzags, may be attached in the assembly utilizing the brackets 16. The spring strips 14, as illustrated, are sinuous in form to define adjacently oppositely facing loops 38 which are joined by straight portions 40. A straight portion 40 of each spring strip 14 is disposed in a pair of hook slots 24 in one of the brackets 16. Thus, the straight portion 40 may be disposed at any one of different positions relative to the frame member to which the associated bracket 16 is attached by being disposed in different pairs of hook slots 24. This is best illustrated in FIG. 2.

The flanges 26 and 28 are arcuate or rounded at the entrance of each hook slot 24 for facilitating the disposal of a spring strip thereinto.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which exclusive property or privilege is claimed are defined as follows:

1. A seating assembly comprising; frame means, at least one spring strip having first and second ends, means connecting said first end to said frame means, at least one bracket attached to said frame means, said bracket including a plurality of attachment means for supporting said second end of said strip at any one of a plurality of positions on said bracket, said second end of said strip being supported by one of said attachment means, said attachment means being spaced from one another along each bracket in a direction which is generally transverse to the associated spring strip, each bracket inluding a first flange and said attachment means comprise hook slots spaced from one another along said flange.

2. An assembly as set forth in claim 1 wherein said spring strip is zigzag in form therealong.

3. An assembly as set forth in claim 1 wherein said bracket includes a second flange which is parallel and spaced from said first flange, a plurality of said hook slots spaced along said second flange, said hook slots in one flange being paired with said hook slots in the other flange, said second end of said spring strip being disposed in and supported by one pair of said hook slots in said flanges.

4. An assembly as set forth in claim 3 wherein said bracket includes a base and said flanges extend therefrom, and a support lip extending transversely from said base in a direction opposite from said flanges and resting upon said frame means, and means attaching said support lip to said frame means.

5. An assembly as set forth in claim 4 wherein said frame means includes a pair of spaced frame members which are interconnected at the ends thereof and including a plurality of said spring strips extending between said frame members, and including a plurality of said brackets.

6. An assembly as set forth in claim 5 wherein each spring strip is zigzag in form therealong.

7. An assembly as set forth in claim 6 wherein each spring strip is sinuous in form therealong to define adjacent oppositely facing loops joined by straight portions, a straight portion of each spring strip being disposed in a pair of said hook slots in one of said brackets and whereby the straight portion may be disposed at different positions relative to the frame member to which the associated bracket is attached by being disposed in different pairs of hook slots therein.

References Cited
UNITED STATES PATENTS

| | | | |
|---|---|---|---|
| 1,936,720 | 11/1933 | Kronheim | 267—182 |
| 2,231,462 | 2/1941 | Cobb | 248—68 X |
| 2,344,339 | 3/1944 | Zwald | 211—86 |
| 2,593,831 | 4/1952 | Bank | 267—111 |
| 3,042,352 | 7/1962 | Stamper | 248—68 |

ARTHUR L. LA POINT, Primary Examiner